United States Patent
Czaykowska et al.

(10) Patent No.: US 7,416,042 B2
(45) Date of Patent: Aug. 26, 2008

(54) METHOD FOR TRIGGERING A TWO-STAGE BELT TENSIONER

(75) Inventors: Anja Czaykowska, Fellbach (DE);
Sabine Aust, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 415 days.

(21) Appl. No.: 10/520,558

(22) PCT Filed: May 6, 2003

(86) PCT No.: PCT/DE03/01435

§ 371 (c)(1),
(2), (4) Date: Aug. 22, 2005

(87) PCT Pub. No.: WO2004/005080

PCT Pub. Date: Jan. 15, 2004

(65) Prior Publication Data

US 2006/0108787 A1    May 25, 2006

(30) Foreign Application Priority Data

Jul. 6, 2002    (DE)    ................. 102 30 483

(51) Int. Cl.
*B60R 21/46* (2006.01)
(52) U.S. Cl. .................. 180/268; 280/806; 701/45
(58) Field of Classification Search ............. 280/801.1, 280/805, 806, 807; 180/268, 274, 281, 282; 701/45
See application file for complete search history.

(56) References Cited

U.S. PATENT DOCUMENTS

| | | | |
|---|---|---|---|
| 5,400,487 A | 3/1995 | Gioutsos et al. | |
| 5,871,236 A | 2/1999 | Bauer et al. | |
| 5,999,871 A * | 12/1999 | Liu | ............ 701/45 |
| 6,036,225 A * | 3/2000 | Foo et al. | ........... 280/735 |
| 7,237,800 B2 * | 7/2007 | Itoga | ........... 280/733 |

* cited by examiner

*Primary Examiner*—Ruth Ilan
(74) *Attorney, Agent, or Firm*—Kenyon & Kenyon LLP

(57) ABSTRACT

A method for triggering a two-stage belt tensioner is provided, in which the second stage of the belt tensioner is triggered as a function of a crash severity and a sitting position. The crash severity is determined by a signal derived from an acceleration and determined during a collision, and the sitting position brings an influence to bear on the evaluation of this signal.

7 Claims, 3 Drawing Sheets

METHOD FOR TRIGGERING A TWO-STAGE BELT TENSIONER

BACKGROUND INFORMATION

The present invention relates to a method for triggering a two-stage belt tensioner.

SUMMARY

A method according to an example embodiment of the present invention for triggering a two-stage belt tensioner may have the advantage that the second stage of the belt tensioner is triggered at a suitable time which is determined as a function of the crash severity and the sitting position of the respective occupant. The crash severity is ascertained with the aid of a signal derived from the acceleration. The sitting position brings an influence to bear on the evaluation of the signal, preferably by influencing threshold values, which are also determined as a function of time and in an adaptive manner.

It may be particularly advantageous if, in the case of hard crash events, the second belt tensioner stage is fired with minimal delay after the first stage, while, in the case of softer or slower crashes, sufficient time is available for a detailed evaluation of the signals derived from the acceleration. These signals may derive from a sensor in the central unit and from external satellite sensors such as upfront sensors for example.

The method according to the present invention may permit the second belt tensioner stage, which is normally fired in a pyrotechnic manner, to be used between the first and the second airbag stages, for example, such that an overall sequence of the restraint devices results in the case of a frontal crash:

Belt tensioner first stage-airbag first stage-belt tensioner second stage-airbag second stage.

Temporally, however, the second belt tensioner stage should be fired preferably before the first airbag stage, so that the method according to the present invention evaluates the time conditions relative to the first belt tensioner stage.

The method according to the example embodiment of the present invention compares the speed signal in the direction of travel, that is, the so-called X-integrator, which integrates the acceleration signal in the direction of travel, with a fixed threshold. This threshold generally varies for the driver, the front-seat passenger and optionally also for the backseat positions. Moreover, different thresholds may be employed for different static conditions under which a crash occurs. Such static conditions are conditions that do not change during the crash. This includes, for example, the position of the driver's seat or the front passenger seat, i.e., large or small distance from the steering wheel or the dashboard, the speed of the vehicle at the onset of the crash, which can be divided into various classes, the speed relative to the obstacle prior to initial contact, which is ascertained using a pre-crash sensory system, and other information available in the vehicle.

Dynamic information from additional functions, which are calculated during the crash from sensor signals, may modify the thresholds as a function of time, i.e., an adaptation is performed.

The method according to the example embodiment of the present invention is calculated only up to a maximum point in time following the exceeding of the threshold for the first belt tensioner stage, that is, a maximum delay between the first and second stages, since otherwise even crashes that do not reach the severity required for triggering the second belt tensioner stage would eventually reach the integrator threshold for the second belt tensioner stage in the later course of the crash. For crashes which only late in the course of a crash prove to be sufficiently severe to require a triggering of the second airbag stage, crashes against a soft barrier for example, it can prove practical to ensure a simultaneous triggering of the second belt tensioner stage and the second airbag stage.

Finally, it is also advantageous if a knee airbag is triggered simultaneously with the second belt tensioner stage. In this case, the second belt tensioner stage may be installed as a second pyrotechnic firing at hip or at shoulder level or also as a bag-in-belt.

BRIEF DESCRIPTION OF THE DRAWINGS

Example embodiments of the present invention are shown in the figures and are explained in more detail below.

DETAILED DESCRIPTION OF EXAMPLE EMBODIMENTS

Conventional systems are designed to trigger a one-stage belt tensioner system as a function of the detected crash severity. The triggering decision algorithm required for this purpose is implemented as follows:

The acceleration signal of the central control unit runs through two central paths. The integral of the acceleration in the x direction, i.e. in the direction of travel, which then represents the speed reduced over the course of the crash, is computed in the upper path, while in the lower path crash- and vehicle-specific characteristics are extracted from the acceleration signal, likewise in the direction of travel, using various filter functions and are converted into a triggering threshold that is a function of acceleration. The triggering decision is then generated by comparing the integrator value with the triggering threshold.

According to the present invention, the triggering of a second belt tensioner stage is now integrated.

Figure 1:
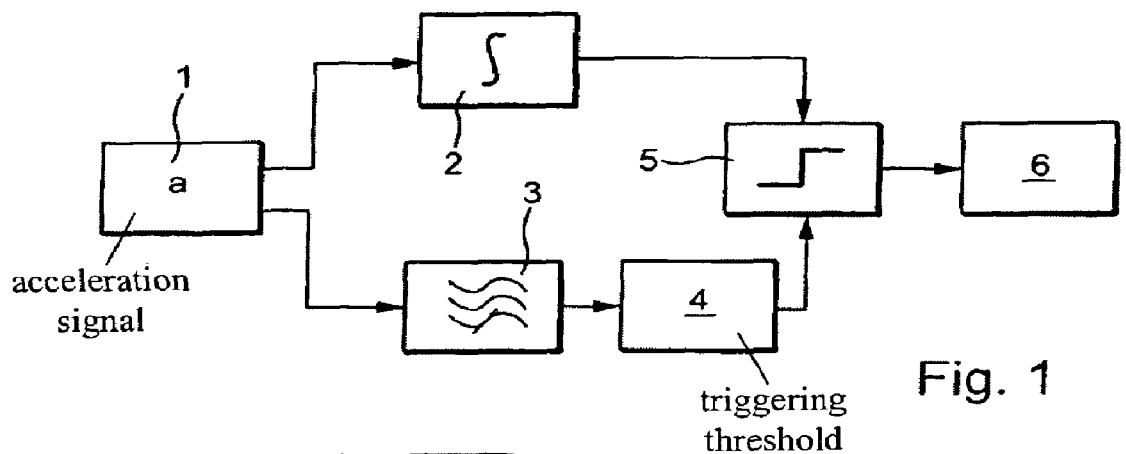
FIG. 1 shows a block diagram of an example method according to the present invention.

FIG. 1 shows, in the form of a block diagram, the fundamental sequence in the evaluation of an acceleration signal a, which is obtained in block 1 by an acceleration sensor. In block 2, this acceleration signal is integrated to form a speed signal, which corresponds to the speed reduced in a crash. In the lower path in block 3, the same acceleration signal is filtered through a filter 3 in order then to determine from this filtered acceleration signal in combination with other vehicle-specific characteristics a triggering threshold for the integrated acceleration signal. This triggering threshold, which is determined as a function of time, is made available as a threshold to a threshold-value decision circuit 5. Threshold-value decision circuit 5 now compares the integrated acceleration signal from block 2 to this threshold. If the integrated acceleration signal falls above this threshold, a triggering case is diagnosed. This is then fed to a block 6, which is responsible for triggering restraint devices. In order finally to trigger the restraint devices, the signal of a plausibility sensor is still required. For this purpose, a safety switch or another acceleration sensor may be used for example.

Figure 2:
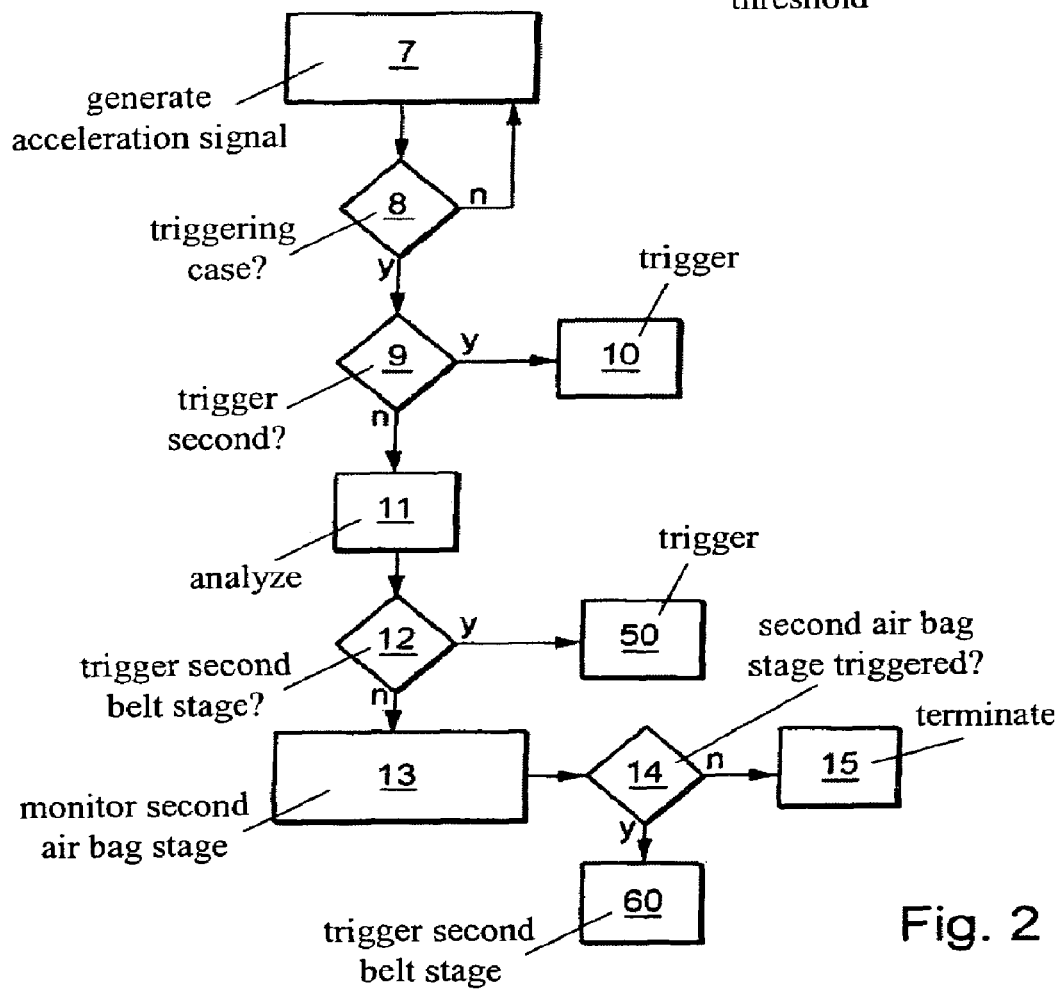
FIG. 2 shows a flow chart of the example method according to the present invention.

FIG. 2 now shows the sequence of the method according to the present invention. Acceleration signal a is generated in a block 1 in method step 7. In method step 8, a threshold-value decision made in threshold-value decision circuit 5 decides whether a triggering case is at hand. If this is not the case, then method step 7 is repeated. If it is the case, however, then a check is performed in method step 9 to determine whether, in addition to the first belt tensioner stage now being triggered, the second belt tensioner stage should be triggered as well. That is to say, a check is performed in step 9 to determine whether a hard crash is at hand. In such a case, the second belt tensioner stage must be triggered immediately and another signal analysis is not necessary. Thus, if a hard crash is detected, the system jumps to method step 10 and the second belt tensioner stage is triggered. In parallel and afterwards, another algorithm computes the triggering decision for the airbags.

The triggering of the belt tensioners also takes data about the occupants into account, i.e., whether the seat is occupied at all, what are the weight parameters of the person, and on which seat the person sits. More or fewer than these three parameters may be used. If the person sits in the driver's seat, then the belt tensioners must be triggered earlier, since the distance to the steering wheel, i.e., to an impact object for the person, is shorter than that from the front-seat passenger to the dashboard. These are static parameters which determine the triggering thresholds in block 4.

If in method step 9 the system recognized that a hard crash is not at hand, thus that only the first stage is triggered, then a detailed signal analysis of the integrated acceleration signal is performed in method step 11. The acceleration signal may be evaluated here as well. If the signal analysis in method step 12 establishes that now the second belt tensioner stage must be triggered as well, since the soft crash, for example, proves to be dangerous enough that the person must be protected by the second belt tensioner stage, then the system jumps to method step 50 in order to trigger the second belt tensioner stage. If the signal analysis in method step 12, however, did not ascertain a triggering for the second belt tensioner stage, then the system jumps to method step 13 in order to monitor the second airbag stage. If now in method step 14 it was established that the second airbag stage is triggered, then the system jumps to method step 60 in order to trigger the second belt tensioner stage as well. If in method step 14 it was established that the second airbag stage is not triggered, then the system jumps to method step 15 in order to terminate the method according to the present invention at this point.

Figure 3:
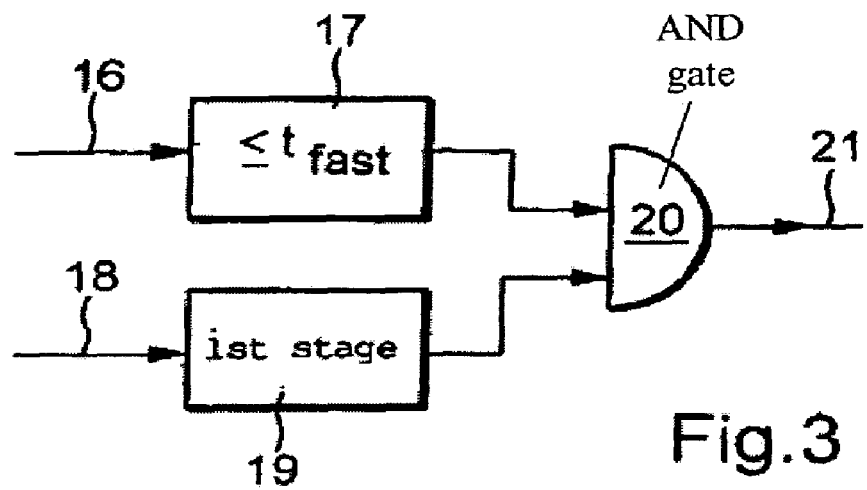
FIG. 3 shows a subfunction of the example method according to the present invention for hard crashes.

FIG. 3 shows the case for a hard crash in the form of a flow chart. The integration time 16, that is, the time since the noise threshold was exceeded and the integration of the acceleration signal A has begun, is fed to a block 17 in which a check is performed to determine whether the integration time falls below the time $t_{fast}$ which was established by experiment to detect a hard crash. That is to say, within this time, the first belt tensioner stage must already have been fired. This is verified in the lower branch. A signal 18 which indicates whether this first stage of the belt tensioner was fired is fed to a block 19. If this is the case, then block 19 issues a logical 1, and block 17 then also issues a logical 1 if the integration time still falls below the time $t_{fast}$. The outputs of both functions 17 and 19 are fed to an AND gate 20 such that AND gate 20 issues a logical 1 only if both conditions indicating a hard crash are fulfilled. Thus, if a logical 1 is present in both, then as output signal of AND gate 20 a logical 1 is issued, which as signal 21 then indicates that now the second belt tensioner stage is also to be fired immediately. This case, therefore, constitutes a hard crash. Here no further signal analysis is performed, which would only result in a delay.

Figure 4:
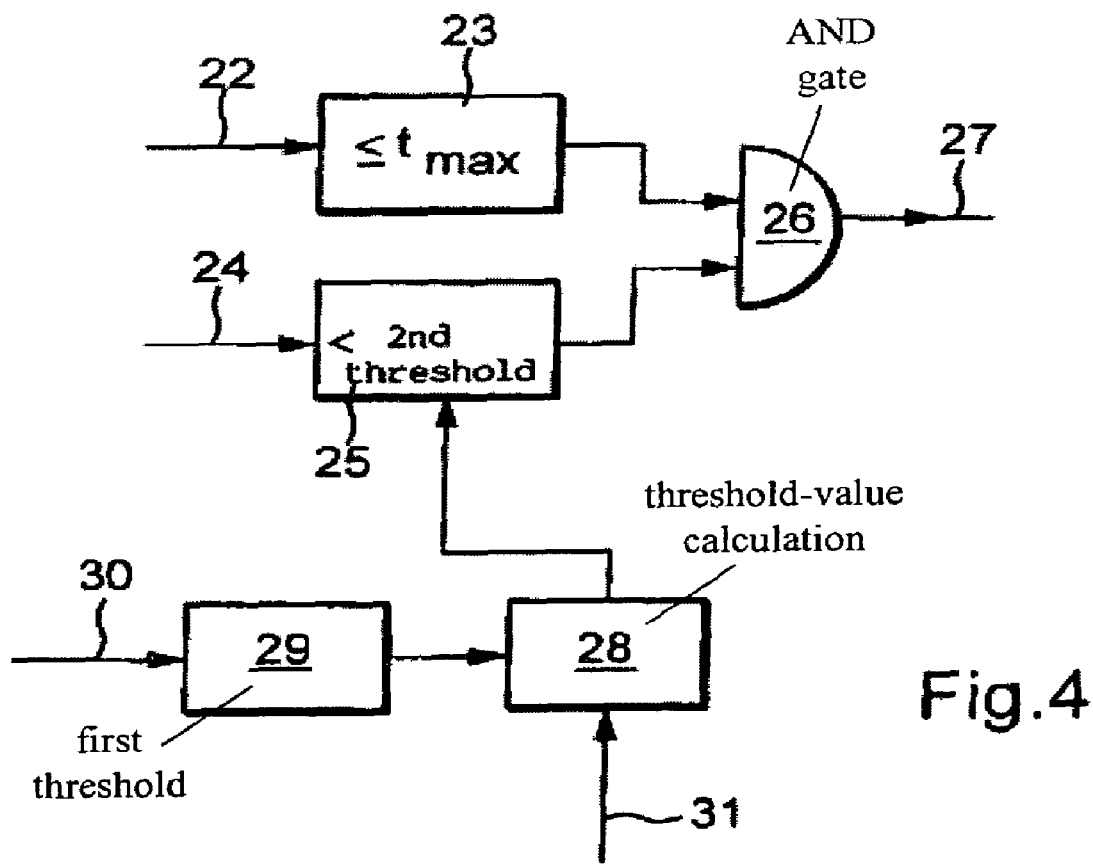
FIG. 4 shows a subfunction of the example method according to the present invention for soft crashes.

FIG. 4 shows the case of a soft crash as a block diagram. A signal 22 provides the integration time to a block 23 which checks whether this integration time falls below a time $t_{max}$. This time $t_{max}$ is fixed in order to ensure that the second belt tensioner stage in the case of a soft crash is not triggered merely because a specific time has elapsed, and thus to avoid an unnecessary triggering of this restraint device. Block 23 thus issues a logical 1 only if the integration time falls below this time $t_{max}$. The output signal of block 23 in turn is fed to an AND gate 26. A signal 24 representing the integrated acceleration signal in the direction of travel is fed to a block 25. In block 25, this integrated acceleration signal is compared to the second threshold, that is, the threshold for the second belt tensioner stage. If this signal falls above the second threshold, then block 25 issues a logical 1 to AND gate 26. AND gate 26, therefore, will issue a logical 1 as output signal 27 only if the integration time falls below the time $t_{max}$ and the second threshold has been exceeded. Second threshold 25, however, is calculated dynamically. This occurs in block 28, which is on the one hand fed by a signal 31, from which dynamic data are derived. On the other hand, static data 30, which initially in block 29 result in a first threshold calculation, also enter into threshold-value calculation 28. This first threshold is fed to block 28 which then modifies this threshold as a function of the dynamic data. As shown above, dynamic data are calculated as a sensor signal, while the static data are conditions that do not change during a crash such as the position of the driver's seat and of the front-passenger seat, the speed of the vehicle at the beginning of the crash, the relative speed as compared to the obstacle prior to initial contact and other such information.

If AND gate 26 now issues a logical 1 as signal 27, then the second belt tensioner stage will be fired.

These signals, whether a belt tensioner was fired, are usually indicated by flags set in registers. The method according to the present invention may generally run on a processor in the central control unit. A microcontroller may be used as such a processor. It is also possible, however, to have this algorithm processed by a distributed intelligence. That is to say, in this case, a separate processor is assigned to the belt tensioners.

Figure 5:
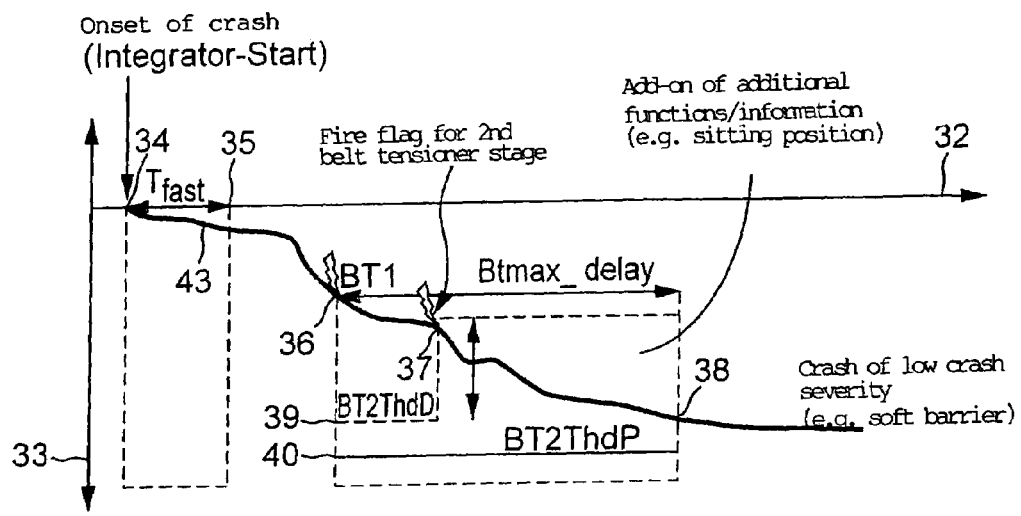
FIG. 5 shows a first signal pattern of the integrated acceleration signal in the x direction.

FIG. 5 shows a first typical crash sequence appearing in a crash of a low crash severity. The crash severity is here determined by a signal derived from the acceleration, in this case by the speed signal. Here the crash severity is established in particular by an analysis of characteristics. Speed signal 43 is represented here in a speed-time diagram. The time is represented on the abscissa 32, while the speed signal is represented on the ordinate 33. The integrator starts at time 34 since at this point a noise threshold is exceeded. From this time 34 on, the time interval is monitored until time $t_{fast}$ 35 in order to ascertain whether a hard crash is at hand. As shown above, the condition is that during this time the first belt tensioner stage is fired. In such a case, after the firing of the first belt tensioner stage following the time $t_{delay}$, which is preset, the second belt tensioner stage is fired automatically without performing another signal analysis. Here this is not the case however. In the further course, the threshold value for the first belt tensioner stage is reached at time 36 and the first belt tensioner stage is fired. Beginning at time 36, the time span is monitored until time 38, for during this time the second belt tensioner stage must be fired unless the event is a crash of such low crash severity, for example against a soft barrier, that the use of the second belt tensioner stage is not necessary. At time 37, however, the threshold for the driver for the second belt tensioner stage is reached, and the second belt tensioner stage is fired. This threshold 39 is composed of the static information described above and an add-on consisting of additional dynamic parameters. Here the crash type detection in particular is taken into account. Signal 43, however, does not reach the threshold 40 for the front-seat passenger during the period ending at time 38, so that here the use of the second belt tensioner stage for the front-seat passenger is not necessary.

Figure 6:
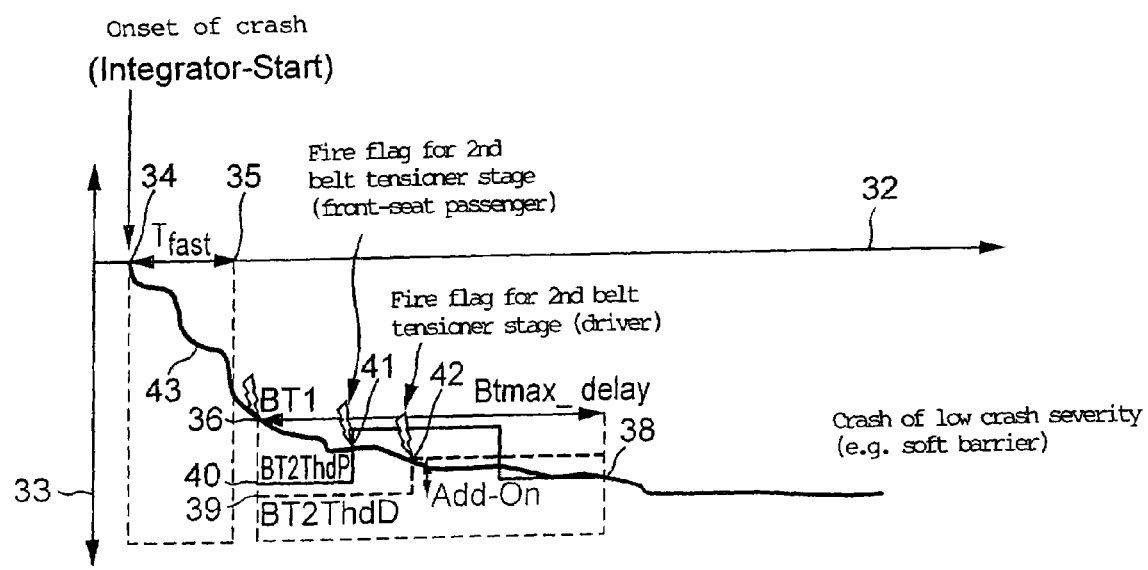
FIG. 6 shows a second signal pattern of the integrated acceleration signal in the x direction.

FIG. 6 shows a crash sequence of high crash severity. The same elements as are represented in FIG. 5 are here indicated by the same reference numerals and are not explained in more detail. Here again, the signal pattern of integrated acceleration signal 43 reaches such a magnitude at time 36 that the first belt tensioner stage is triggered. Again, the system monitors until time 38 whether the second belt tensioner stage is triggered. In this case, however, the threshold for the front-seat passenger is exceeded by signal 43 already at time 41, so that here the second belt tensioner stage for the front-seat passenger is triggered. Threshold 40 in this case is lowered at time 41 by the crash signal on the basis of the dynamic data, and thus this threshold is exceeded. The subsequent signal pattern reveals that threshold 40 is raised again. The threshold for the driver 39 is exceeded by signal 43 only at time 42. Here too, the signal pattern causes an adaptation of the threshold. Consequently, the second belt tensioner stage for the driver is also triggered at time 42. Overall this represents a typical pattern for a crash of high crash severity, in the case of a crash into a hard barrier for example.

The requirements for triggering the second belt tensioner stage are generally different for the driver and the front-seat passenger. Thus, for example, the second belt tensioner stage should be fired for the driver already in case of a lower crash severity than in the case of the front-seat passenger, so as to avoid knee injuries. This applies especially to a sitting position very close to the steering wheel. By contrast, the danger of injury to the front-seat passenger by slipping through below the belt, also known as submarining, only becomes relevant in the case of higher crash severities.

What is claimed is:

1. A method for triggering a two-stage belt tensioner, comprising:
    triggering a first stage of the belt tensioner before a first airbag stage; and
    triggering a second stage of the belt tensioner as a function of a crash severity and a sitting position, the crash severity being determined by at least one signal derived from an acceleration ascertained during a collision, and the sitting position influencing an evaluation of the at least one signal.

2. The method as recited in claim 1, wherein, if the crash severity indicates a hard crash, the second stage is triggered after a specified time following the triggering of the first stage.

3. The method as recited in claim 1, wherein, if the crash severity indicates a soft crash, the second stage is triggered as a function of a signal pattern of the at least one signal.

4. The method as recited in claim 1, wherein the second stage is triggered with a second airbag stage.

5. The method as recited in claim 1, further comprising:
    triggering a knee airbag simultaneously with the second stage of the belt tensioner.

6. A triggering device comprising:
    a control unit configured to trigger a first stage of a two-stage belt tensioner before a first airbag stage, the device further configured to trigger a second stage of the belt tensioner as a function of a crash severity and a sitting position, the crash severity being determined by at least one signal derived from an acceleration ascertained during a collision and the sitting position influencing an evaluation of the at least one signal.

7. The triggering device as recited in claim 6, further comprising: an external crash sensor to determine the acceleration.

* * * * *